United States Patent [19]
Farris et al.

[11] Patent Number: 4,890,507
[45] Date of Patent: Jan. 2, 1990

[54] BICYCLE PEDAL BINDING

[75] Inventors: Mark S. Farris; Michael A. Harrison, both of Newport Beach, Calif.

[73] Assignee: Avante Sport, Newport Beach, Calif.

[21] Appl. No.: 155,970

[22] Filed: Feb. 16, 1988

[51] Int. Cl.[4] .............................................. G05G 1/14
[52] U.S. Cl. ................................. 74/594.6; 74/594.4; 36/131
[58] Field of Search ................. 74/594.5, 594.6, 594.7, 74/594.4; 36/131, 132

[56] References Cited

U.S. PATENT DOCUMENTS

| | | | |
|---|---|---|---|
| 550,403 | 11/1895 | Hanson | 74/594.6 |
| 4,442,732 | 4/1984 | Okajima | 74/594.5 |
| 4,686,867 | 8/1987 | Bernard et al. | 74/594.6 |

FOREIGN PATENT DOCUMENTS

| | | | |
|---|---|---|---|
| 0169080 | 1/1986 | European Pat. Off. | 74/594.6 |
| 3426103 | 1/1986 | Fed. Rep. of Germany | 74/594.6 |
| 3507735 | 9/1986 | Fed. Rep. of Germany | 74/594.6 |
| 3638155 | 5/1987 | Fed. Rep. of Germany | 74/594.6 |
| 2578804 | 3/1986 | France | 74/594.6 |
| 60971B80 | 10/1980 | Italy | 74/594.6 |

OTHER PUBLICATIONS

Faster Peddling, Look, Descente America, Inc., 601 Madison Ave., New York, N.Y. 10022, (1985).
Gipiemme, Italian Technology & Tradition in Cycling, Bicycling Magazine, Apr. 1982, p. 16.
Winwood Instep Pedal Insert, Performance Bicycle Shop Catalog, Summer 1988, Tel. 1-800-PBS-AIDE (1-800-727-2433).
Bicycle Guide, Apr. 1987, pp. 60, 61. Article by John Derven & Ted Constantino entitled Keywin & Pedalmaster.

*Primary Examiner*—Vinh Luong
*Attorney, Agent, or Firm*—Fred Flam

[57] ABSTRACT

A pedal is provided with a frontal half hoop or ring. A plastic cleat attached to the shoe of the cyclist has a circular plate that fits the hoop or ring. Registry is achieved by a pin or hook that projects forwardly of the plate. The pin or hook captures the hoop or ring. To engage the coupling, the cleat is outwardly pivoted and then returned so that companion rigid clips on the cleat and the pedal interlock. A detent retracts downwardly as the clips move into engagement. Such downward movement is effected by a moderately sloped first cam surface; an adjoining steeply sloped second cam locking surface of the detent keeps the cleat in locked position. In an unlatched position, force can yet be effectively applied to the pedal whereby so that unrestrained complete separation or full latching are options while the bicycle is operated.

13 Claims, 4 Drawing Sheets

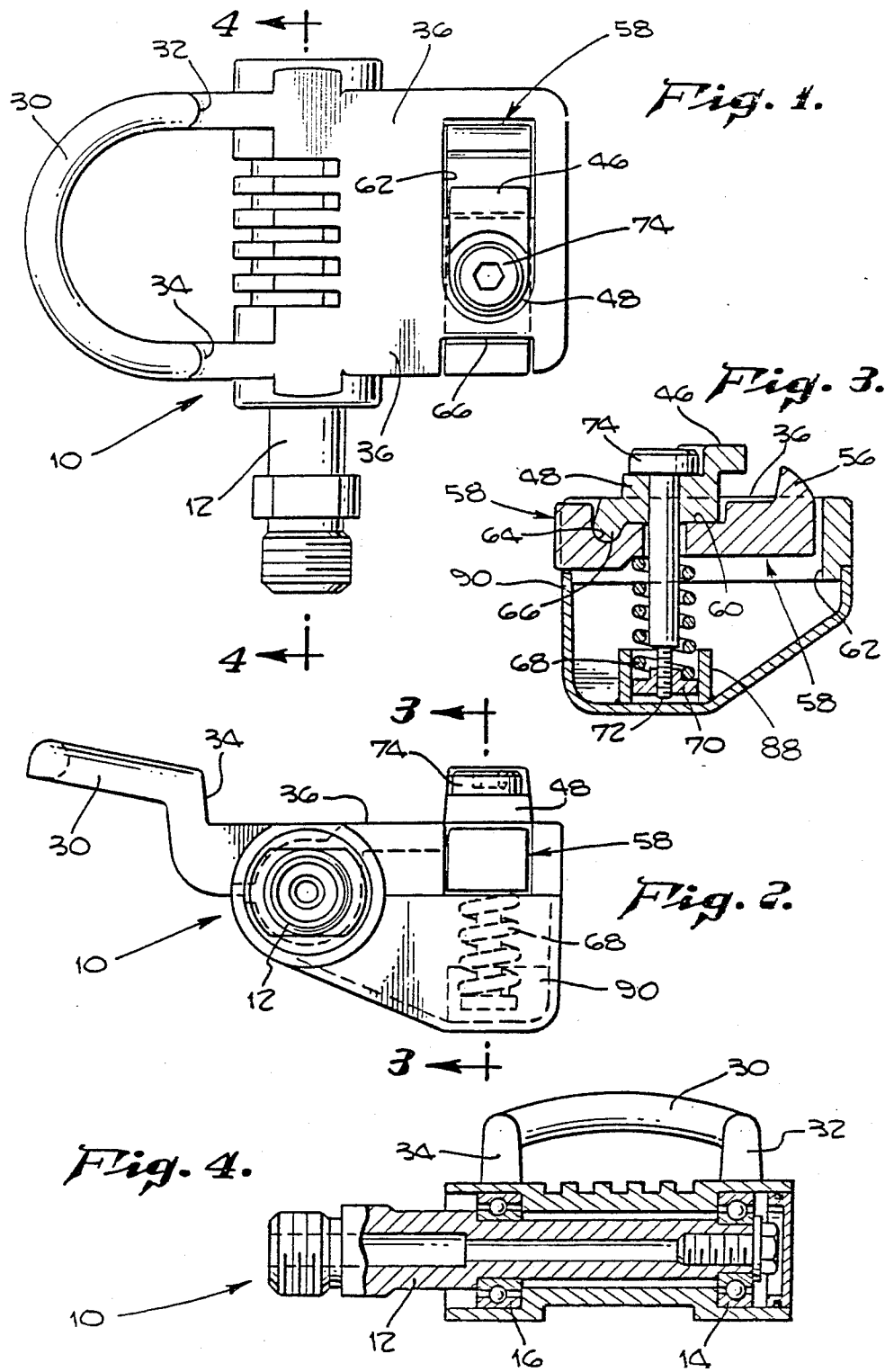

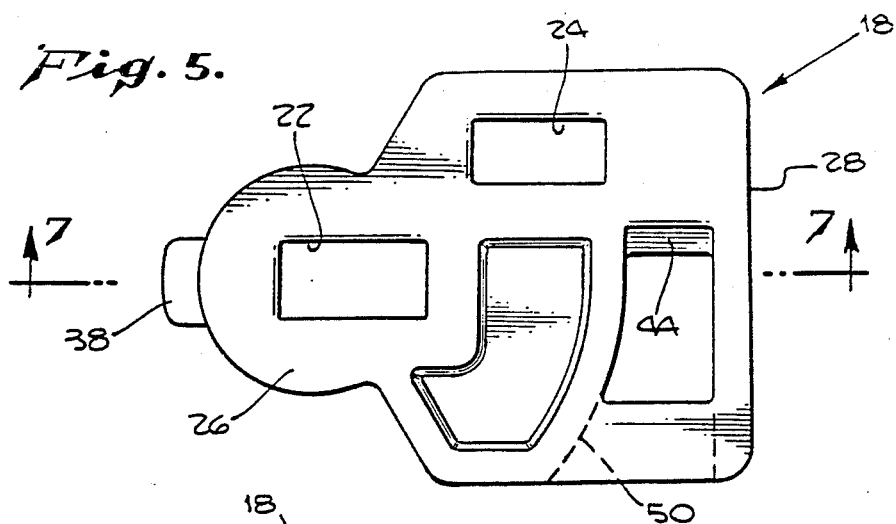
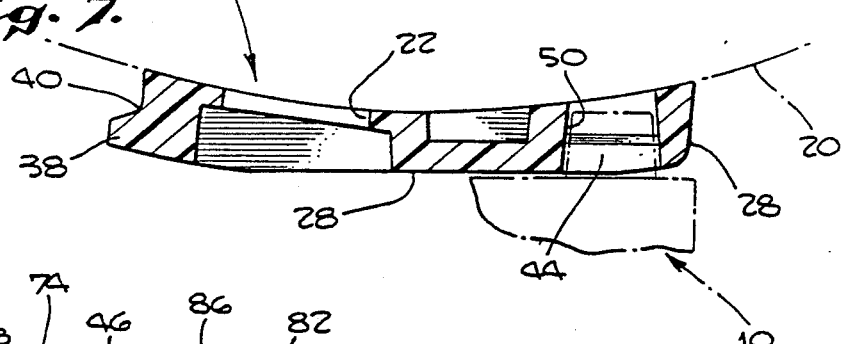
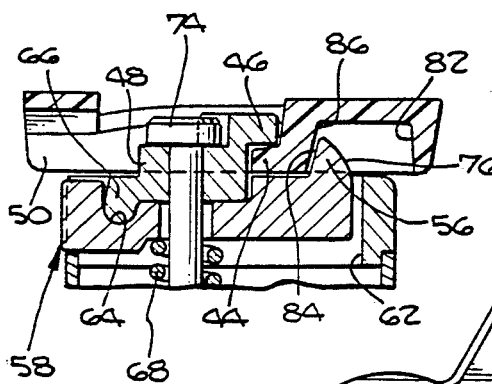
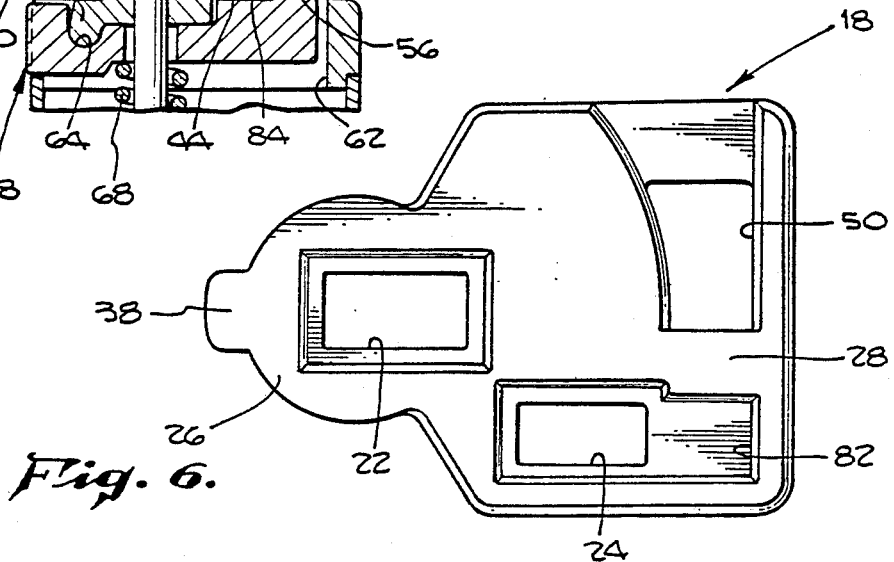

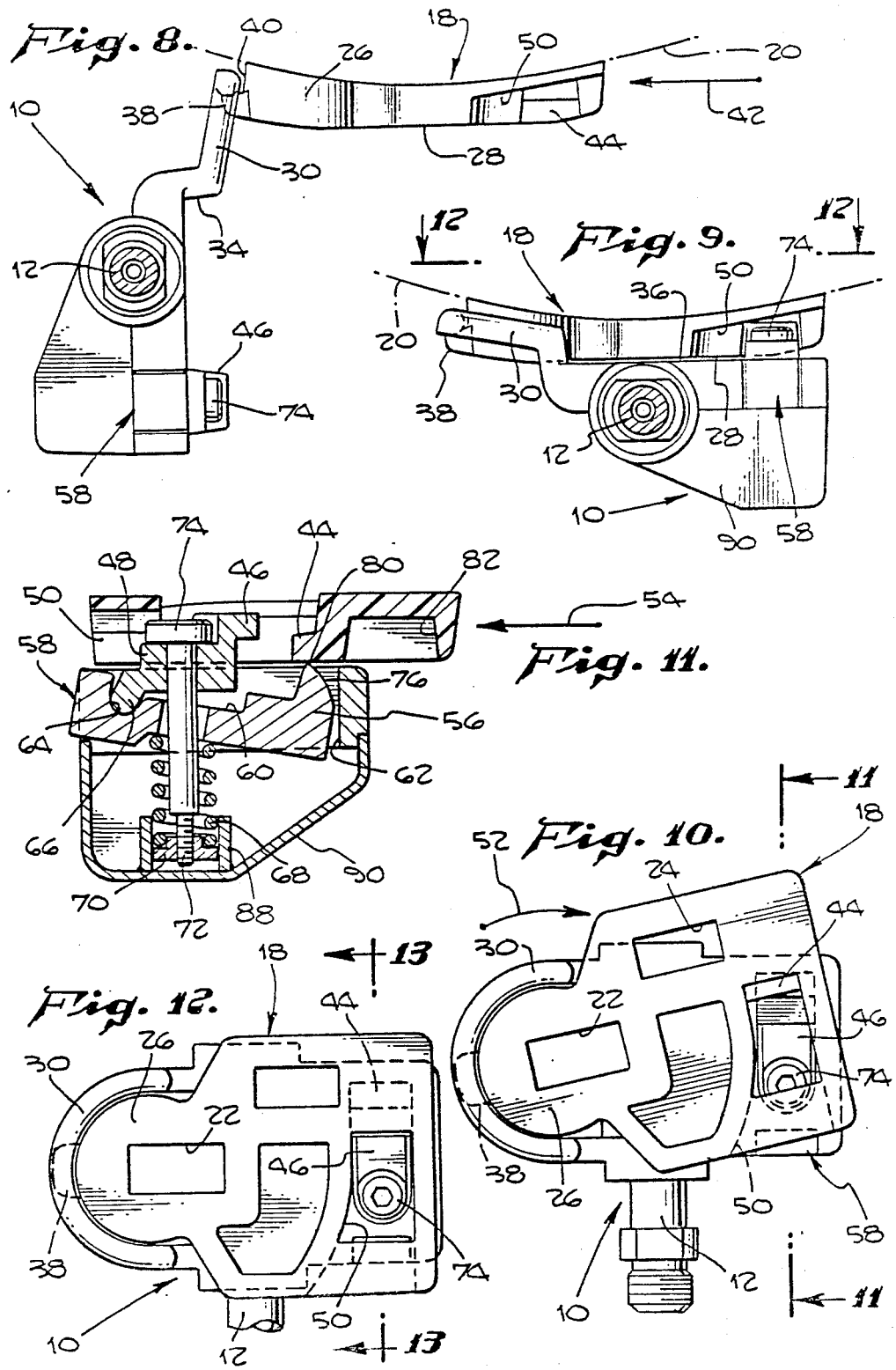

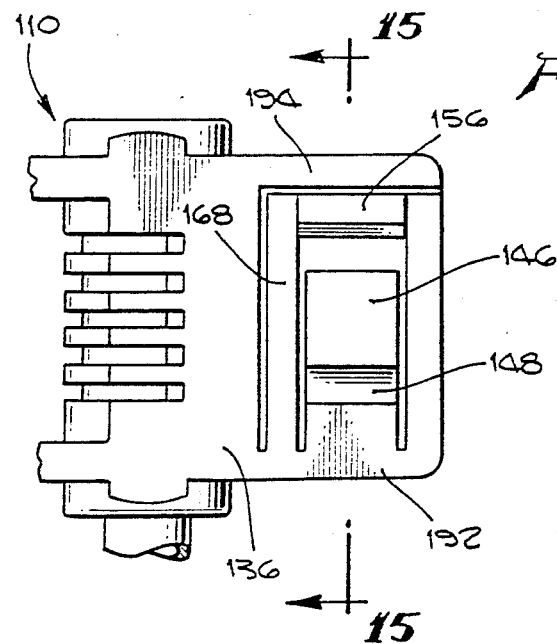
Fig. 14.
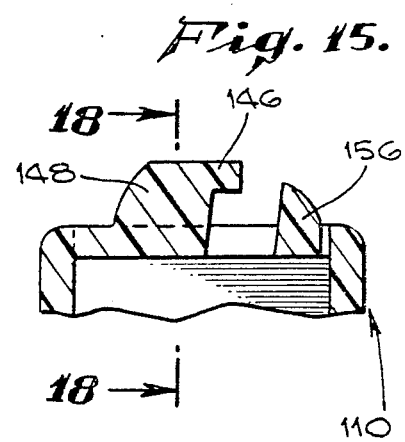
Fig. 15.
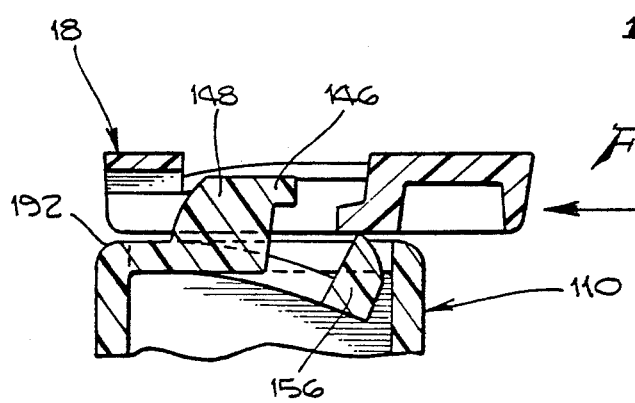
Fig. 16.
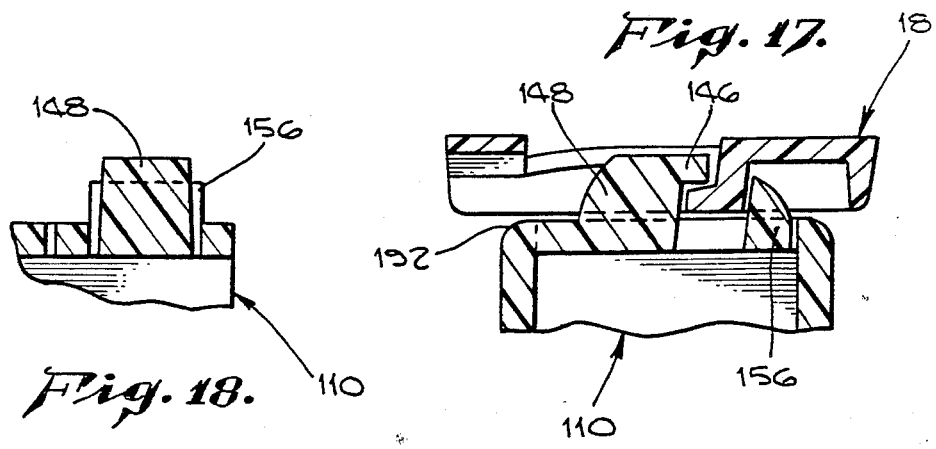
Fig. 17.
Fig. 18.

BICYCLE PEDAL BINDING

FIELD OF THE INVENTION

This invention relates to a mechanism for releasably coupling a cleat attached to the bottom of the cyclist's shoe to the bicycle pedal whereby pedal force can be effectively transmitted to the bicycle drive mechanism throughout the entire cycle of crank movement, and not merely during the downstroke.

BACKGROUND OF THE INVENTION

Although releasable pedal bindings for bicycles have been known for many years, as evidenced, for example, by 1895 U.S. Pat. No. 550,409 to Hanson, such devices are now increasingly demanded by competitors as well as by bicycle enthusiasts in general. Discriminating users have imposed exacting specifications, such as (1) engagement and disengagement by foot movement alone; (2) insurance against accidental release; (3) adjustable release force; (4) compactness to ensure against any compromise of cornering clearance, to ensure that the ball of the foot is comfortably close to the pedal axis, and to ensure light weight; (5) secure connection free of slack with not discomfort imposed.

Several devices have attempt to satisfy these criteria. The mechanism shown in 1987 U.S. Pat. No. 4,686,867 to Bernard and Mercier and the KEYWIN binding manufactured by Keywin Sports Limited of New Zealand are both widely used. Yet they suffer certain disadvantages. For example, the KEYWIN binding utilizes a leaf spring as the operative element of the latch. This leaf spring in incapable of adjustment, and for some, difficult to operate. Entry into the KEYWIN binding is cumbersome, and not well assisted by the mechanism. The Bernard/Mercier mechanism utilizes a weight biased binding that tilts upwardly for easy automatic entry, and in this report is superior to the KEYWIN binding. But the Bernard/Mercier mechanism utilizes a latching claw that pivots rearwardly about an axis essentially parallel to the pedal axis. For latching, a transverse cam surface along the back of the cleat is provided that engages a transverse cam surface of the claw. Upon exertion of heavy downward step-in pressure, the claw yields rearwardly and then snaps over the cleat. Release occurs by motion in a different direction, namely angular foot movement about a vertical axis. But the same strong spring forces must be overcome to effect release. The cam surfaces to achieve release necessarily have only slight slope in order to obtain the necessary force multiplication. As a consequence, sidewise slack is difficult to eliminate. The coupling is or becomes less than rigid.

One of the objects of the present invention is to provide a pedal binding that meets the essential criteria above set forth, which is free of the foregoing disadvantages.

Along the path of travel, a cyclist may encounter certain traffic or other conditions that suggest the possibility, but not the certainty, that a stop may be required. It is an object of the present invention to provide a pedal binding that allows the cyclist to prepare for a stop by releasing the latch without actually uncoupling the binding parts. The cyclist then has the option to effect quick unrestrained desengagement at the last possible moment, maintaining control and power in the interim. If it is determined that a stop is not needed, the binding is easily reconnected by a simple angular movement of the foot.

Neither the KEYWIN nor the Bernard/Mercier structure is capable of such operation. Anticipation is not possible; either the device is coupled or released. There is no middle ground. Thus, when the latch is released, power can no longer be effectively applied to the pedal. Needless release and reconnect operations may recur with loss of control and power; or the cyclist may unduly delay a decision to release.

SUMMARY OF INVENTION

In order to accomplish the foregoing objective, a pedal is provided with a half hoop or ring at its forward portion and a flat contact pad at its rear portion. The hoop or ring is in a plane slightly elevated relative to the contact plane of the pad. A plastic cleat attached to the shoe of the cyclist has a generally circular bearing plate that fits within the hoop or ring to provide an extended arcuate line of engagement therebetween. A pin, spur or hook projects forwardly from the periphery of the plate to capture the hoop or ring. With the pin or hook engaged, forward movement of cleats tilts the pedal to meet the cleat. To engage the coupling, the cleat is outwardly pivoted and then returned about the axis of the engaged circular plate. As the cleat returns, companion rigid clips on the cleat and the pedal interlock.

A detent is spring pressed upwardly of the pedal pad. It retracts downwardly as the clips move into engagement. Such downward movement is achieved by a moderately sloped first cam surface on the outside of the detent lobe; a steeply sloped second cam surface on the inside of the lobe locks the cleat in position. The rigid interlocking clips transmit vertical force to the pedal independently of the detent and its spring. The detent spring resists only pivotal separating movement of the cleat. Since the second cam surface is steep, a tight, slack free connection is achieved. Separation occurs when the cleat is forcefully pivoted outwardly, causing the inside or second cam surface to retract the detent.

The hook and hoop at the front of the binding also provide means for applying upward force to the pedal. The clip on the pedal directly opposes a rearwardly facing surface of the cleat whereby rearward force is applied to the pedal. Lateral stability in ensured by the circular plate.

The binding is quite operative to transmit motive force when the cleat is released from the latch. This can take place in two modes. First, the cleat can be pivoted outwardly with the clips separated, in which case the circular plate and hook are yet connected with a large area of the cleat contacting the rear pad of the pedal. Second, the cleat can be in line with the pedal with the cleat clip on top of, and not interfitting the pedal clip, in which case the circular plate and hook are yet connected; the clips transmit downward thrust to the pedal. The cyclist may select either mode to start, or, after starting to anticipate a possible stop.

This invention possesses many other advantages, and has other objects which may be made more clearly apparent from a consideration of the embodiments of the invention hereinafter shown and described.

BRIEF DESCRIPTION OF THE DRAWINGS

A detailed description of the invention will be made with reference to the accompanying drawings wherein like numerals designate corresponding parts in the several figures. These drawings are to scale. Only the right pedal binding structure is illustrated; however, it will be understood that the left pedal binding is the mirror equivalent of the pedal binding illustrated.

FIG. 1 is a top plan view of a right bicycle pedal incorporating the present invention.

FIG. 2 is a side elevational view of the pedal.

FIG. 3 is a transverse sectional view taken along a plane corresponding to line 3—3 of FIG. 2 and illustrating the detent and clip arrangement of the pedal.

FIG. 4 is a transverse sectional view taken along a plane corresponding to line 4—4 of FIG. 1, and showing the pedal mounting post.

FIG. 5 and 6 are top and bottom plan views, respectively, of the companion shoe cleat.

FIG. 7 is a longitudinal sectional view taken along a plane corresponding to line 7—7 of FIG. 5, the pedal clip being shown in phantom lines.

FIG. 8 is primarily a side elevational view showing the position of the pedal and cleat when in first contact for effecting a coupling therebetween.

FIG. 9 is a similar elevational view showing the pedal and cleat in engagement. The bottom of the cyclist's shoe is shown in phantom lines in FIGS. 7, 8 and 9.

FIG. 10 is a top plan view showing the pedal and superposed cleat as the clips of the pedal and cleat move into position with the detent depressed.

FIG. 11 is a sectional view taken along a plane corresponding to line 11—11 of FIG. 10.

FIG. 12 is a top plan view of the connected pedal and superposed cleat, taken in the direction indicated by lines 12—12 of FIG. 9.

FIG. 13 (SHEET 2) is a sectional view of the latch and clip mechanism taken along a plane corresponding to line 13—13 of FIG. 12.

FIG. 14 (SHEET 4) is a fragmented top plan view of a right bicycle pedal illustrating a second embodiment of the present invention.

FIG. 15 is a fragmented transverse sectional view taken along the plane corresponding to line 15—15 of FIG. 14.

FIGS. 16 and 17 are sectional views similar to FIG. 15, but showing the shoe cleat as it moves into the pedal binding.

FIG. 18 is a vertical sectional view taken along a plane corresponding to line 18—18 of FIG. 15.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, the scope of the invention being defined by the appended claims.

In FIG. 1 there is shown a bicycle pedal 10 supported in a conventional manner upon an axle post 12 by a pair of roller bearings 14 and 16. One end of the post is attached to the crank arm (not shown) of a bicycle whereby power is transmitted to the drive mechanism.

A thin relatively rigid plastic cleat 18 (FIG. 5) is attached to the cyclist's shoe 20 shown in phantom lines in FIG. 7. Screw fasteners or the like (not shown) pass through access openings 22 and 24 in a conventional manner to allow minor adjustments in placement. A pivot plate 26 projects forwardly of the cleat 18. The pivot plate 26 is formed substantially as a circular segment, its periphery extending arcuately for significantly more that 180 degrees. At the rear end of the cleat is a sole 28.

The pivot plate 26 is designed to register with the forward portion of the pedal 10. For this purpose, the pedal 10 is provided with a bearing ring or hoop 30 (FIGS. 1, 2 and 4) sized to receive the pivot plate 26. The bearing ring 30 is semi-circular, extending forwardly and arcuately from one side of the pedal to the other. The total arcuate extent of the bearing ring 30 is 180 degrees or slightly less so that the pivot plate can enter from the rear. The ring 30 has angled ends 32 and 34 that join the body of the pedal 10 adjacent the axle 12 in order to position the ring forwardly and in a plane upwardly offset from of the contact pad 36 at the rear of the pedal 10.

A hook, spur or pin 38 (FIGS. 5, 6 and 7) projects forwardly from the periphery of the pivot plate 26 to guide the circular pivot plate 26 into registry with the ring 30. The hook or pin 38 as shown in FIG. 7 is spaced from the bottom of the shoe to form a recess 40 in which a segment of the ring 30 may be received. In FIG. 8, the dominant weight of the rear portion of the pedal 10 orients the ring 30 upwardly. By a simple foot manipulation, the hook or pin 38 is caused to capture the ring and seat it in the recess 40. Subsequent forward movement of the cleat 18 (indicated by the arrow 42) moves the pedal down as successive portions of the ring and plate guide each other into full registry as shown in FIG. 9. Full registry is achieved even if the hook or pin is not exactly centered at the apex of the ring 30. In the registered position of FIG. 9, the hook 38 provides a coupling for transmission of upward force to the pedal. The pivot plate 26 and ring 30 provide lateral stability while downward force may be exerted by the cleat on the rear pad portion of the pedal.

A full coupling between the cleat and the pedal is achieved at the rear of the cleat at the pedal pad 36. For this purpose, the cleat has a clip 44 (FIGS. 10 and 11) positioned to engage beneath a companion clip 46 of the pedal 18. The clip 46 of the pedal (FIGS. 1, 2 and 3) is formed as an overhanging ledge at the right hand end of a raised land 48 as viewed in FIG. 3. The cleat clip 44 is formed as a tongue or projection at the inner right hand end of a recess 50 formed on the bottom of the cleat 18. See also FIGS. 5 and 6. In order to move the clips 44 and 46 into engagement, the cleat is first pivoted outwardly slightly beyond the position shown in FIG. 10 while the pivot plate 26, hook 38 and ring 30 are in engagement and while the sole 28 is in sliding contact with the pedal pad 36. In such position, the cleat recess 50 accommodates the land 48 and clip 46. Coupling is achieved simply by pivoting the cleat back into alignment as indicated by the arrow 52 and 54 in FIGS. 10 and 11 respectively. Ultimately, the engaged position of FIG. 13 is achieved. In this position, upward force exerted on the cleat is transmitted to the pedal through the clips 44 and 46 as well as through the hook 38 and ring 30.

When the cleat and pedal are in full engagement, as shown in FIG. 12, the rearwardly facing surface of the cleat recess 50 is directly opposed by a forwardly facing surface of the land 48 so that rearward force is directly transferred to the pedal. Forward force is transmitted through the plate 26 and hoop or ring 30 as well as by opposed surfaces of the cleat recess 50 and the land 48.

When the cleat and cyclist are connected as described, the bottom of the cyclist's shoe lies very close to the center line of the axle, thus achieving maximum stability. This is made possible by the very thin cleat and by upwardly offsetting the hoop or ring 30. The hook 38, while projecting forwardly, does not project downwardly below the pivot plate 26. Similarly the cleat clip 44 is recessed to lie entirely above the sole of the cleat. Hence when separated from the pedal, the cyclist can comfortably walk on the cleat without involvement of the hook or the clip.

In order tightly to latch the cleat 18 to the pedal 10, a detent 56 (FIG. 3) is provided. The detent is formed at one end of a rocker arm 58 that is accommodated in a transversely extending recess 60 in the pedal 10. This recess 60 opens downwardly of the pedal 10 as well as to the top of the pad 36 on the inside and outside of the pedal land 48. The opening 62 at the outside of the land accommodates the detent 56 and allows it to project above the pad 36 (FIG. 3) or to be retracted (FIG. 11).

The detent is spring pressed normally to project above the pad 36. For this purpose the rocker arm has a socket 64 at the end opposite the detent. The socket fits a fulcrum 66 formed on the pedal. The upper end of a compression spring 68 exerts pressure on the center of the rocker from below, and hence urges the detent 56 to project above the pad 36. The lower end of the spring 68 is anchored upon a nut 70 that in turn is threadedly mounted at the end of a post 72. The post 72 extends through the land 48, with its accessible head 74 resting on top of the land. By turning the head 74, such as by an socket wrench, the tension of the spring 68 is adjusted. A non-circular cup 88 surrounds the nut 70 to prevent it from turning with the post 72. The cup 88 is formed on the inside of a cap 90 that fits the bottom of the pedal and that encloses the spring, nut and post. In the position shown, the tension of the spring 68 is a minimum.

The projected detent 56 is in the path of inward movement of the cleat clip 44. However, as illustrated in FIG. 11, the detent 56 automatically retracts by virtue of its sloping cam surface 76 that faces outwardly to be engaged by the clip 44. The slope of this surface 76 is relatively slight, such as one to one or 45 degrees, whereby the spring force is easily overcome. In the position of FIG. 11, the lobe or crest 80 of the detent rides along the under side of the clip 44.

Once the clips are fully engaged (FIG. 13), the detent 56 snaps into a recess 82. This recess 82 is formed on the under side of the cleat (FIG. 6) adjacent the mounting hole 24. The detent 56 has an abrupt inwardly facing cam surface 84 that forms a locking surface 84 on the inside of the lobe or crest 80. This locking surface has a very steep rise and is nearly, but not quite perpendicular to the pad 36. The companion surface 86 of the recess is correspondingly sloped. The steep rise produces a tight, secure fit between the cleat and the pedal such that the cyclist need not apply any force to keep the parts together. The cyclist's efforts are efficiently applied to forward, downward, rearward and upward movement of the pedal in continuous rhythm.

When stopped, the cyclist must remove one of his feet to achieve static stability. To release the cleat from the pedal, the cyclist pivots his foot outwardly about the axis of the circular plate 26. A relatively heavy effort is required to cam the detent 56 downwardly by interaction of the surfaces 86 and 84. Once this is achieved, however, the cyclist need not immediately separate the entire cleat from the pedal; instead the cyclist can continue to operate the pedal quite effective with the parts in the position of FIGS. 10 and 11. In this position, the cleat sole and pedal pad are in face to face contact for transmission of downward force to the pedal; the pivot plate 26 transmits forward thrust through the ring 30 and also provides lateral containment; the hook 38 yet provides coupling for transmission of upward thrust to the pedal. Hence a large measure of control and connection still pertains. In the position of FIGS 10 and 11, the cyclist is ready to achieve complete separation without encountering any resistance from the detent. This anticipatory partial separation allows the cyclist the option of stopping if need be, or of recoupling the binding. In this position, however, the cyclist's foot is slightly skew.

If a skew position is uncomfortable, an effective coupling can be achieved by very slightly raising the cleat from the position of FIG. 11 and returning it so that the clip 44 overlies the clip 46. In such position (not shown), the pivot plate 26 and hook 38 are yet engaged, and power can be transmitted to the pedal while allowing the cyclist to anticipate for possible stop or reconnect.

DETAILED DESCRIPTION OF THE SECOND EMBODIMENT

Structural and operational characteristics attributed to the form of the invention first described shall also be attributed to form of the invention now to be described, unless such characteristics are obviously inapplicable or unless specific exceptions are made.

In the form shown in FIG. 14 to 18, a detent 156, similar to the detent 56 of the previous form, is in this instance formed as an integral part of the body of the pedal 110. Thus the detent 156 is formed as the bight or connecting portion of a generally U-shaped leaf spring 168. The proximal ends of the two arms of the leaf spring 168 project laterally outwardly from a relatively rigid tail piece 192. The tail piece 192 extends rearwardly from the inside of the pedal pad 136. A companion relatively rigid tail piece 194 extends rearwardly from the outside of the pedal pad 136. Together the tail pieces protectively surround the leaf spring 168. The body of the pedal 110 is made of material having the characteristics to provide the requisite flexibility and resilience for operation of the leaf spring 168.

The clip 146 and land 148 like the clip 46 and land 48 of the previous form, are formed as rigid integral parts of the body of the pedal 110.

Except for adjustment of the tension of the spring 168, the operation is the same as the previous form. The same cleat 18 cooperates in the same manner, and as illustrated in FIGS. 16 and 17. While the adjustment feature is sacrificed, the pedal is much more compact, with consequent improved road clearance.

Intending to claim all novel, useful and unobvious features and combinations of features shown and/or described, I claim:

1. In a bicycle pedal binding:
   a. bicycle pedal;
   b. means mounting said pedal for pivotal movement about an axis; said pedal having a rear pad area and a front hoop area on opposite sides of said axis, the weight of said pedal normally orienting said hoop upwardly and said pad area downwardly;
   c. a thin cleat for attachment to the cyclist's shoe, and having a pivot plate projecting forwardly of said cleat, said pivot plate having the shape of a circular segment, the periphery of said pivot plate extending arcuately for more than 180 degrees, said pivot plate fitting inside said hoop to register therewith, said cleat also having a sole portion at its rearward end for contacting said rear pad area for transmission of downward thrust to said pedal;

d. a hook extending forwardly of said plate for capturing said hoop whereby said hoop and plate mutually guide each other into registry; and e. means located rearwardly of said hoop and at said pad area and operable by the foot of the cyclist for releasably locking said sole portion to said pad area to maintain said pivot plate and said hoop in registry, said locking means and said registering pivot plate and hoop together operating to transmit upward, downward, forward and rearward thrust from said cleat to said pedal.

2. The pedal binding as set forth in claim 1 in which releasably locking means comprises companion clips on said pedal and said cleat that interlock and separate upon pivotal movement of said cleat about the axis of said hoop and plate while said hoop and plate are in registry.

3. The pedal binding as set forth in claim 2 in which said pad has a land with an overhanging ledge forming the clip of said pedal, and in which said cleat has a downwardly opening recess for receiving said land, there being a projection at one end of said recess forming the clip of said cleat.

4. The pedal binding as set forth in claim 3 together with a detent mounted on said pedal for releasably locking said clips together, a spring for projecting said detent into the path of movement of said cleat clip, said detent having an outwardly facing first cam surface of low slope for retracting said detent by inward movement of said cleat clip, said detent having an abrupt inwardly facing second cam surface for locking said clip of said cleat in position, said second cam surface yielding downwardly against the force of said spring upon the exertion of adequate force exerted by said cleat clip.

5. The pedal binding as set forth in claim 4 in which said sole portion of said cleat has a substantial area of engagement with said pedal pad when said cleat is pivoted outwardly with said clips disengaged whereby said pedal is yet largely coupled to said cleat for application of motive power to said pedal.

6. The pedal binding as set forth in claim 3 in which said sole portion of said cleat has a substantial area of engagement with said pedal pad when said cleat is pivoted outwardly with said clips disengaged whereby said pedal is yet largely coupled to said cleat for application of motive power to said pedal.

7. The pedal binding as set forth in claim 2 together with a detent mounted on said pedal for releasably locking said clips together, a spring for projecting said detent into the path of movement of said cleat clip, said detent having an outwardly facing first cam surface of low slope for retracting said detent by inward movement of said cleat clip, said detent having an abrupt inwardly facing second cam surface for locking said clip of said cleat in position, said second cam surface yielding downwardly against the force of said spring upon the exertion of adequate force exerted by said cleat clip.

8. The pedal binding as set forth in claim 7 in which said sole portion of said cleat has a substantial area of engagement with said pedal pad when said cleat is pivoted outwardly with said clips disengaged whereby said pedal is yet largely coupled to said cleat for application of motive power to said pedal.

9. The pedal binding as set forth in claim 2 in which said sole portion of said cleat has a substantial area of engagement with said pedal pad when said cleat is pivoted outwardly with said clips disengaged whereby said pedal is yet largely coupled to said cleat for application of motive power to said pedal.

10. In a bicycle pedal binding:

a. bicycle pedal;

b. means mounting said pedal for pivotal movement about an axis; said pedal having a pad area rearwardly of said axis and a semi-circular hoop forwardly of said axis;

c. a thin cleat for attachment to the cyclist's shoe, said cleat having a sole at its rear portion and a pivot plate projecting forwardly of said cleat, said pivot plate having the shape of a circular segment, the periphery of said pivot plate extending arcuately for more than 180 degrees, said pivot plate being adapted to register with said hoop;

d. a hook extending forwardly of said plate for capturing said hoop whereby said hoop and plate mutually guide each other into registry; and e. means operable by the foot of the cyclist for releasably coupling said sole portion to said pad area for transmission of upward, downward, forward and rearward thrust from said cleat to said pedal.

11. The pedal binding as set forth in claim 10 in which said hoop is upwardly offset from said pad, and in which said hook is located within the plane of said cleat sole.

12. In a pedal binding:

a. a bicycle pedal;

b. means mounting the pedal for pivotal movement about an axis; said pedal having a pad rearwardly of said axis;

c. a thin cleat for attachment to the cyclist's shoe; said cleat having a pivot plate at its frontal portion;

d. said pedal having a bearing ring for receiving and registering with said pivot plate; said bearing ring extending forwardly and arcuately from one side of said pedal to the other not more than 180 degrees for rearward retraction of said pivot plate;

e. said cleat having a hook projecting forwardly of said pivot plate for capturing said bearing ring to initiate registry between said pivot plate and said bearing ring and to transmit upward force from the cleat to said pedal during the course of cycling movement; and f. companion clip means on said cleat and said pedal respectively at the sole and pad for coupling said cleat and pedal upon inward pivotal movement of said cleat about the axis of said bearing ring.

13. In a pedal binding for a bicycle or the like:

a. a pedal;

b. means mounting the pedal for pivotal movement about an axis; said pedal having a pad located in large measure rearwardly of said axis; said pedal having a semi-circular hoop or ring extending forwardly of the said axis from one side of said pedal to the other;

c. a thin cleat adapted to be attached to a shoe; said cleat having a sole at its rear; said cleat having a laterally opening recess at its sole;

d. a laterally projecting clip located at the end of said cleat recess, no portion of said clip projecting beyond said sole;

e. said cleat having a pivot plate at its forward end formed substantially as a circular segment, there being a hook projecting forwardly of said pivot plate to capture said ring to initiate registered engagement between said pivot plate and said ring;

f. said pedal having a land projecting upwardly of said pad and receivable in said cleat recess, said land having a clip projecting laterally from the top of said land to receive the clip of said cleat upon inward pivotal movement of said cleat;

g. a rocker pivotally mounted beneath said pedal and having a detent;

h. a spring urging said rocker yieldingly to project said detent upwardly through an aperture in said pedal at the side of said land and in the path of inward movement of the clip of said cleat;

i. said detent having a cam surface for retracting said detent upon inward movement of said cleat, and having a locking surface for releasably holding said clips in engagement;

j. said cleat and pedal maintaining substantial engagement at said pivot plate, hook and hoop and at said sole and pad while said clips are out of engagement whereby power may be transmitted transmission of power to said pedal even with said detent lock disengaged.

* * * * *